(12) United States Patent
Benning et al.

(10) Patent No.: US 11,197,490 B2
(45) Date of Patent: Dec. 14, 2021

(54) STURGEON ROE SACK MEMBRANE-DERIVED OIL

(71) Applicant: Shah Caviar Limited, Burscough (GB)

(72) Inventors: Kenneth Benning, London (GB); Jemima Benning, London (GB)

(73) Assignee: Shah Caviar Limited, Lancashire (GB)

(*) Notice: Subject to any disclaimer, the term of this patent is extended or adjusted under 35 U.S.C. 154(b) by 0 days.

(21) Appl. No.: 15/548,088

(22) PCT Filed: Mar. 16, 2016

(86) PCT No.: PCT/GB2016/050704
§ 371 (c)(1),
(2) Date: Aug. 1, 2017

(87) PCT Pub. No.: WO2016/203187
PCT Pub. Date: Dec. 22, 2016

(65) Prior Publication Data
US 2018/0014564 A1    Jan. 18, 2018

(30) Foreign Application Priority Data

Jun. 16, 2015   (GB) .................... 1510540

(51) Int. Cl.
| | |
|---|---|
| C11B 1/10 | (2006.01) |
| A23L 17/30 | (2016.01) |
| A23B 4/20 | (2006.01) |
| C11B 13/00 | (2006.01) |
| A23K 10/22 | (2016.01) |

(52) U.S. Cl.
CPC ............ *A23L 17/30* (2016.08); *A23B 4/20* (2013.01); *A23K 10/22* (2016.05); *C11B 1/10* (2013.01); *C11B 13/00* (2013.01); *A23V 2002/00* (2013.01); *Y02W 30/74* (2015.05)

(58) Field of Classification Search
USPC ........................... 426/608, 643, 630
See application file for complete search history.

(56) References Cited

U.S. PATENT DOCUMENTS

| | | | | |
|---|---|---|---|---|
| 2004/0068010 A1* | 4/2004 | Zicker | .................. | A61K 31/202 514/560 |
| 2009/0246335 A1 | 10/2009 | Koehler-Guenther | | |

FOREIGN PATENT DOCUMENTS

| | | |
|---|---|---|
| AU | 2016277986 | 6/2018 |
| AU | 2016277986 | 5/2019 |
| CA | 2989254 | 12/2018 |
| CN | 2003-061572 | 3/2003 |
| CN | 1974741 A * | 6/2007 |
| CN | 104544315 | 4/2015 |
| CN | 20168005982.0 | 4/2020 |
| CN | 201680005982.0 | 12/2020 |
| EA | 201890065 | 5/2018 |
| EA | 201890065 | 2/2020 |
| EP | 2 868 207 | 5/2015 |
| JP | S54-160773 | 12/1979 |
| JP | S59-130172 | 7/1984 |
| JP | S59-227272 | 12/1984 |
| JP | H02-222641 | 9/1990 |
| JP | H07-308174 | 11/1995 |
| JP | H10-028521 | 2/1998 |
| JP | 2007-246430 | 9/2007 |
| JP | 2014-217310 | 11/2014 |
| JP | 2018-517497 | 1/2019 |
| KR | 20130139476 A * | 12/2013 |
| KR | 10-2018-7001376 | 4/2019 |
| NZ | 738292 | 5/2018 |
| NZ | 738292 | 1/2019 |
| SG | 11201710534 R | 8/2018 |
| SG | 11201710534 R | 8/2019 |
| SG | 11201710534 R | 9/2019 |
| WO | 2003/083021 | 10/2003 |

OTHER PUBLICATIONS

Ovissipour et al., "Fatty Acid Composition of Farmed White Sturgeon Acipenser transmontanus Ovary at Different Ages and Ovarian Fat Content"—Aquaculture America 2014—Meeting Abstract, https://www.was.org/meetings/ShowAbstract.aspx?Id=31514, pp. 1-3. (Year: 2014).*

Bligh et al.,"A Rapid Method of Total Lipid Extraction and Purification", Can. J. Biochem. Physiol. vol. 37 (1959), pp. 911-917. (Year: 1959).*

Kim (KR20130139476(A)—English Translation, pp. 1-12. (Year: 2013).*

McGee, "Fish and Shellfish", On Food and Cooking: The Science and Lore of the Kitchen, Simon and Schuster, Mar. 2007, p. 240. (Year: 2007).*

Cancler, The Home Preserving Bible: A Complete Guide to Every Type of Food Preservation with Hundreds of Delicious Recipes, Penguin, Oct. 2012, pp. 1-7. (Year: 2012).*

Hao, CN1974741 (A)—English Translation, pp. 1-4. (Year: 2007).*

Communication under Rule 71(3) EPC (Notification of Intention to Grant), issued in connection with corresponding European Patent Application No. 16716048.0, dated Apr. 4, 2018, 15 pages.

Bledsoe et al., "Caviars and Fish Roe Products," Critical Reviews in Food Science and Nutrition (2003) 43(3):317-356.

Hao et al., "Extraction of Fish Oil from the Muscle of Sturgeon Using Supercritical Fluids," Adv Mat. Res (2013) 655-657:1975-1981.

Hao et al., "The effects of different extraction methods on composition and storage stability of sturgeon oil," Food Chem (2015) 173:174-282.

(Continued)

*Primary Examiner* — Lien T Tran

(74) *Attorney, Agent, or Firm* — Evan Law Group LLC

(57) ABSTRACT

Preservation of newly-extracted roe sacks of sturgeons for subsequent harvesting of roe and caviar production, wherein said preservation employs an oil derived from roe sack membrane normally discarded in conventional caviar production. Such preservation enables roe sacks with retained roe derived from farmed or wild sturgeon to be stored and transported whereby export can be considered. The same oil, or fatty acid-containing fractions thereof, may also find use in dietary compositions, e.g. pet foods.

19 Claims, No Drawings

(56) References Cited

OTHER PUBLICATIONS

Olsen et al., "Challenges and realistic opportunities in the use of by-products from processing of fish and shellfish," Trends in Food Science and Technology (2014) 36:144-151.
International Search Report and Written Opinion for PCT/GB2016/050704, dated Aug. 12, 2016, 6 pages.
Ovissipour et al., "Using Image Processing to Determine Ovarian Fat Content in Farmed White Sturgeon *Acipenser transmontanus*", World Aquaculture Society Meetings, Aquaculture America 2014—Meeting Abstract, 1 page.
Shaolian, C. et al., "Preliminary report on biochemical analysis of tissues of Acipenser sinensis and psephurus gladius", Acta Hydrobiologica Sinica, vol. 10, No. 2, p. 1, (1986). (With English Translation).
Zhongguo, Y.S., "History of Chinese Food Volume 6", Xu Hairong, Hangzhou Publishing House, pp. 411-412, (2014). (With English Translation).
"Import and export tariff commodities and items notes", Edited by the Customs Administration Department of the General Administration of Customs China Business Press, vol. 1, chapters 1-52, pp. 15, (2007). (with English translation).
"Food Chemistry", Edited by Belitz et al., interpreted by Shi Jieping et I., China Agricultural University Press, pp. 509, (2008). (with English translation).
Meihua, Y. et al., "Development and utilization of biological resources", China Light Industry Press, pp. 370-371, (2003). (with English translation).
"Livestock feed and feeding", Edited by R.O. Kellers, et al., interpreted by Cheng Gang et al., China Agricultural University Press, pp. 467, (2006). (with English translation).

\* cited by examiner

STURGEON ROE SACK MEMBRANE-DERIVED OIL

CROSS REFERENCE TO RELATED APPLICATIONS

This application is a U.S. National Phase Application of International Application No. PCT/GB2016/050704, filed Mar. 16, 2016, which claims priority to and the benefit of Great Britian Patent Application No. 1510540.6 filed on Jun. 16, 2015 the entire contents of which are incorporated herein by reference in their entirety.

FIELD OF THE INVENTION

The present invention relates to an oil composition derived from emptied sturgeon roe sacks (ovaries) as normally discarded in conventional caviar production. Such an oil composition may be used for preserving isolated sturgeon roe sacks for subsequent harvesting of roe for caviar production. The same oil composition, and fatty acid-containing fractions thereof, may find use as dietary components, e.g. by incorporation in food products such as pet food, or by provision as dietary supplements. Such an oil composition may be combined with harvested sturgeon roe following washing as a flavour supplement in caviar production.

BACKGROUND TO THE INVENTION

Caviar as referred to herein corresponds with traditional use of the term solely in relation to salt-treated, unfertilized eggs or roe from ovaries of female sturgeons, a luxury food owing to its difficulty of production and perishable nature. Sturgeon is the common name for a large number of fish species of the family Acipenseridae, including the genera *Acipenser, Huso, Scaphirhynchus* and *Pseudoscaphirhynchus* (for more information see: www.sturgeonweb.co.uk). Often it is used more exclusively to refer to two species commonly connected with caviar production, *Acipenser* and *Huso*. For example Beluga caviar derived from wild Beluga sturgeon (*Huso huso*) has traditionally been much prized, but other sturgeon species are also well-known for caviar production and are increasingly farmed. These include for example Siberian sturgeon (*Acipenser baerii*), now being farmed for the first time for caviar production in the UK by Exmoor Caviar, and other *Acipenser* species. One of the problems for caviar production is the many years female sturgeons take to reach reproductive maturity. Female Siberian sturgeons commonly take 8-10 years to become mature and produce eggs; females of some species, e.g. Beluga sturgeon, take far longer, e.g. around 20 years or more. To reduce this time, some hybrid crosses have been achieved, e. g. male *Huso huso* sturgeon have been crossed with faster maturing species such as *Acipenser sterlet* or *baerii* to provide hybrid species for farming. The present invention is applicable to caviar production whenever ovaries are extracted from any species or hybrid species of sturgeon for this purpose; this remains the most common and preferred initial step for caviar production.

Whilst farming of sturgeons addresses the ecological problem of relying on wild sturgeon for caviar production and enables caviar production more widely, there remains for caviar producers the problem of the need for careful timing of harvesting of the roe, preferably very shortly before spawning, coupled with need for roe sacks to be quickly processed once extracted to avoid deterioration of the roe. This is still a delicate task usually done by hand. The roe sacks are normally gently rubbed across a sieve, either a nylon mesh or stainless steel sieve, whereby the roe eggs are separated from the membrane of the roe sack and pass through the sieve to be collected. Running cold water may be employed to aid the roe release and separation. Salt will be added to the separated roe according to requirement for taste and to aid preservation. A stabilizer may be additionally added such as E285 stabilizer. The roe, which is now caviar, is packed into containers with airtight sealing, normally under vacuum, for refrigerated storage. The caviar may be subsequently re-packaged in smaller quantities, e.g. into tins at 10-125 g per tin.

SUMMARY OF THE INVENTION

The present invention enables extraction of sturgeon roe sacks to be advantageously divorced from roe harvesting for a substantial period of time whereby extracted ovaries may be processed at a far later date. The present invention for the first time makes it feasible to transport extracted sturgeon roe sacks containing roe substantial distances, and even export such roe sacks for caviar production, while avoiding unacceptable deterioration of the roe and enabling production of caviar with desirable taste. As indicated above, this has been achieved using an oil composition derived from discarded remains of roe sacks after roe harvesting and referred to as Biobengeon™ oil. Roe sacks with unharvested roe can be immersed in this oil and vacuum-packed in air-tight containers for storage and/or transport with refrigeration.

While others have previously looked at extracting oil from dried sturgeon muscle by various methods (see Hao et al. (2015) Food Chem., 173, 274-282: "The effects of different extraction methods on composition and storage stability of sturgeon oil"), it has not previously been appreciated that any useful oil composition might be extracted from normally discarded membrane remains of sturgeon roe sacks following harvesting of the roe. Nor has any sturgeon-derived oil been proposed for use in preserving extracted sturgeon roe sacks ahead of roe harvesting.

In one aspect, as indicated above, the present invention now provides a method of obtaining a sturgeon-derived oil wherein the oil is extracted from membrane of sturgeon roe sacks following separation of the roe from the roe sacks.

In a preferred embodiment, such a method for obtaining an oil composition suitable for use in storing extracted sturgeon roe sacks still containing roe, comprises
  (1) processing membrane of sturgeon roe sacks following roe extraction to obtain a liquid mixture;
  (2) heating said mixture whereby proteins are denatured and an oil composition accumulates (visible as a golden-coloured fluid) and
  (3) separating said oil composition.

Such separation may conveniently be carried out using a sieve to separate the oil from visible clumps of matter. Alternatively, such separation may be achieved by centrifugation. The separated fluid will generally be refrigerated for storage and subsequent use.

The oil composition thus obtained (Biobengeon oil) can be employed in the preservation of newly-extracted sturgeon roe sacks containing roe as further detailed below. It is envisaged that other sturgeon-derived oils may be similarly employed, either derived from roe sack membrane by different methods or derived from sturgeon muscle. However, Biobengeon oil prepared as discussed above is preferred since the method can be carried out very conveniently without any complex equipment or need for additional reagents.

DETAILED DESCRIPTION OF THE INVENTION

Processing of sturgeon ovary membrane for obtaining therefrom the desired oil composition may be achieved using simply a food blender, although a larger blender may be employed for larger scale production. Heating may be at any temperature whereby proteins are denatured and clump and the required oil accumulates. Generally a temperature of at least about 70° C. will be employed, e.g. at least about 80-85° C. or at least about 90° C.-95 ° C. or at least about 100° C. A temperature of about 120° C. has, for example, been found suitable by the inventors.

Once separated from the mixture, e.g. for convenience using a sieve, the resulting fluid (Biobengeon oil) may be employed in a protocol for preserving extracted sturgeon roe sacks with retained roe comprising:
(1) submerging one or more roe sacks in said fluid, preferably at refrigerated temperature, e. g. about 2-4° C., in a container suitable for vacuum packing such that they are completely covered by said fluid;
(2) sealing the container
(3) and applying a vacuum whereby the roe sacks are vacuum-packed.

The container will normally be refrigerated for storage, preferably at around 2° C.

As indicated above, it is envisaged that other sturgeon-derived oils might be similarly, although less conveniently applied, including known oils derived from sturgeon muscle. In particular, it is envisaged that other methods previously employed to extract sturgeon oil from sturgeon muscle and fish oils from other fish parts might also be applied to extract oil from sturgeon roe sack membranes. Such well-known extraction methods include enzymatic extraction employing a protease, extraction using ammonia and ammonium sulphate or a supercritical fluid extraction (SFE) method, e.g. with carbon dioxide as a solvent. For further details of such methods reference may be made to Hao et al. (2015) ibid. and references therein re fish oil extraction, e.g. Hao et al. (2013) Adv. Materials Res. 657, 1975-1981: "Extraction of fish oil from the muscle of sturgeon using supercritical fluids."

Extracted sturgeon roe sacks with retained roe and packaged for storage and/or transport by a method as a described above constitute a further aspect of the invention.

For subsequent harvesting of roe, roe sacks thus stored will simply be removed from the container and harvesting of the roe and caviar production may then be carried out in known manner. Cold water rinsing of the roe during and/or after harvesting may be preferred. Caviar can thus be prepared from such stored roe sacks with no significant deterioration in quality as regards appearance and good taste. Furthermore, as indicated above, oil prepared from roe sack membrane in accordance with the invention, or a fatty-acid containing fraction thereof, may optionally be included in a caviar preparation prior to packaging to influence taste. The caviar thus obtained may be initially packed, e.g. under vacuum, and then subsequently re-packed in smaller quantities in conventional manner.

In this way a use is provided for roe sack membranes which would otherwise be simply discarded and which greatly aids more cost-effective caviar production and enables export of full sturgeon roe sacks from farmed or wild sturgeon.

As indicated above, furthermore oil derived from sturgeon roe sack membranes in accordance with the invention, or fatty acid-containing fractions thereof, may have use more widely as dietary supplements. A method of the invention for obtaining such an oil may thus further comprise incorporating the oil, or a fatty acid-containing fraction thereof, into a dietary composition suitable for either human or non-human animal consumption, e. g. a pet food, for example a canine or cat pet food. Such a pet food may include additionally other sturgeon-derived product, e.g. sturgeon muscle.

In a further embodiment, the present invention provides a dietary composition, e.g. a pet food such as a canine or cat pet food, including an oil composition of the invention. As indicated above, such a pet food may include additionally, for example, sturgeon muscle and/ or other sturgeon-derived product, e.g. fragments of sturgeon roe sac. It may be formulated as a pet food treat, e.g. in the form of pellets or balls.

The following non-limiting example is provided to illustrate the invention.

EXAMPLE

Oil was extracted from sturgeon roe sack membranes of farmed *Acipenser baerii* by:
1) taking sturgeon roe sack membrane derived from roe sacks following roe harvesting and placing it in a food blender;
2) macerating the membrane in the blender until thick and smooth;
3) transferring the macerated roe sack membrane into a container and heating to 120° C.;
4) permitting oil to accumulate as a golden-coloured fluid and protein to clump;
5) separating the oil using a sieve and
6) refrigerating the oil.

The oil thus obtained (referred to as Biobengeon™ oil) was analysed for its fatty acid content by Eurofins Food Testing UK and found to have the following composition consistent with its oil definition:

| Analysis of Biobengeon oil | |
|---|---|
| Analyte | Result |
| Moisture | 0.281 g/100 g |
| Crude Protein (N × 6.25) (Dumas) | <0.1 g/100 g |
| Ash | <0.1 g/100 g |
| Carbohydrates (available) | <0.1 g/100 g |
| Total fat | 100.1 g/100 |
| Total dietary fibre (AOAC) | <0.5 g/100 g |
| Energy value (kcal) | 901 kcal/100 g |
| Energy value (kJ) | 3700 kJ/100 g |
| Sodium | <0.01 g/100 g |
| Enterobacteriaceae | <10 cfu/g |
| *Escherichia coli* | <10 cfu/g |
| Fructose | <0.1 g/100 g |
| Galactose | <0.1 g/100 g |
| Glucose | <0.1 g/100 g |
| Lactose | <0.1 g/100 g |
| Maltose | <0.1 g/100 g |
| Monounsaturated fatty acids (MUFA) | 50.54 g/100 g |

-continued

Analysis of Biobengeon oil

| Analyte | Result |
| --- | --- |
| Polyunsaturated fatty acids (PUFA) | 22.92 g/100 g |
| presumptive Lactic Acid Bacteria | 610 cfu/g |
| Salt (via sodium × 2.5) | <0.025 g/100 g |
| Saturated fatty acids (SFA) | 18.99 g/100 g |
| Sucrose | <0.1 g/100 g |
| Total sugars | <0.1 g/100 g |
| Trans Fatty Acids | 0.95 g/100 g |

The invention claimed is:

1. A method of preparing sturgeon roe sack membrane-derived oil, comprising:
    harvesting roe from sturgeon roe sacks, to produce sturgeon roe and sturgeon roe sack membrane, wherein the sturgeon roe sack membrane contains protein and oil;
    subjecting the sturgeon roe sack membrane to a protein denaturing treatment to separate the oil from the protein in the sturgeon roe sack membrane; and
    collecting the oil to obtain the sturgeon roe sack membrane-derived oil.

2. The method of claim 1, wherein the subjecting the sturgeon roe sack membrane to the protein denaturing treatment comprises:
    macerating the sturgeon roe sack membrane, to produce a liquid mixture;
    heating the liquid mixture, to cause the protein to denature and clump and the oil to accumulate.

3. The method of claim 2, wherein said heating is heating the liquid mixture to at least about 100° C.

4. The method of claim 1, wherein the subjecting the sturgeon roe sack membrane to the protein denaturing treatment comprises digesting the protein in the sturgeon roe sack membrane with a protease.

5. Sturgeon roe sack membrane-derived oil prepared by a method comprising:
    harvesting roe from sturgeon roe sacks, to produce sturgeon roe and sturgeon roe sack membrane, wherein the sturgeon roe sack membrane contains protein and oil;
    subjecting the sturgeon roe sack membrane to a protein denaturing treatment to separate the oil from the protein in the sturgeon roe sack membrane; and
    collecting the oil to obtain the sturgeon roe sack membrane-derived oil.

6. The sturgeon roe sack membrane-derived oil of claim 5, wherein the sturgeon roe sacks are sturgeon roe sacks of sturgeon of the genus Acipenser.

7. The sturgeon roe sack membrane-derived oil of claim 5, wherein the sturgeon roe sacks are sturgeon roe sacks of sturgeon of the species Acipenser baerii.

8. A method for preserving whole sturgeon roe sacks, comprising:
    submerging whole roe sacks in the sturgeon roe sack membrane-derived oil of claim 5 in a container suitable for vacuum packing; and
    sealing and applying a vacuum to the container, to vacuum pack the whole sturgeon roe sacks.

9. The method of claim 8, further comprising refrigerating the container.

10. Package preserved whole sturgeon roe sacks, comprising:
    a sealed container,
    the sturgeon roe sack membrane-derived oil of claim 5, in the sealed container, and
    whole sturgeon roe sacks, submerged in the sturgeon roe sack membrane-derived oil, in the sealed container,
    wherein the sealed container is under vacuum.

11. A method of producing caviar, comprising:
    opening the packaged preserved whole sturgeon roe sacks of claim 10,
    removing the whole sturgeon roe sacks from the container,
    harvesting roe from the sturgeon roe sacks, to produce sturgeon roe, and
    salting the sturgeon roe, to produce the caviar.

12. Caviar, comprising:
    the sturgeon roe sack membrane-derived oil of claim 5,
    sturgeon roe, and
    salt.

13. the caviar of claim 12, further comprising a stabilizer.

14. The caviar of claim 12, wherein:
    the sturgeon roe sacks are sturgeon roe sacks of sturgeon of the genus Acipenser, and
    the sturgeon roe are sturgeon roe of sturgeon of the genus Acipenser.

15. The caviar of claim 12, wherein:
    the sturgeon roe sacks are sturgeon roe sacks of sturgeon of the species Acipenser baerii, and the sturgeon roe are sturgeon roe of sturgeon of the species Acipenser baerii.

16. Pet food, comprising the sturgeon roe sack membrane-derived oil of claim 5.

17. A method of preparing caviar, comprising:
    harvesting roe from sturgeon roe sacks, to produce sturgeon roe and sturgeon roe sack membrane, wherein the sturgeon roe sack membrane contains protein and oil;
    subjecting the sturgeon roe sack membrane to a protein denaturing treatment to separate the oil from the protein in the sturgeon roe sack membrane;
    collecting the oil to obtain the sturgeon roe sack membrane-derived oil;
    adding the sturgeon roe sack membrane-derived oil to the sturgeon roe; and
    salting the sturgeon roe.

18. The method of claim 17, wherein the sturgeon roe sacks are sturgeon roe sacks of sturgeon of the genus Acipenser.

19. The method of claim 17, wherein the sturgeon roe sacks are sturgeon roe sacks of sturgeon of the species Acipenser baerii.

* * * * *